J. F. BYLAND.
Walking Planter.

No. 100,974. Patented March 22, 1870.

United States Patent Office.

JOHN F. BYLAND, OF WALTON, KENTUCKY.

Letters Patent No. 100,974, dated March 22, 1870.

---

IMPROVEMENT IN CORN-PLANTING ATTACHMENT FOR PLOWS.

---

The Schedule referred to in these Letters Patent and making part of the same.

---

I, JOHN F. BYLAND, of Walton, Boone county, Kentucky, have invented a new and useful Corn-Planting Attachment for Plows, of which the following is a specification.

*Nature and Objects of the Invention.*

My invention relates to a corn-planting device adapted to be temporarily attached to the rear and drawn along in the furrow of a common plow or marker, the mode of attachment of the planter being such as to cause it to rest upon the bottom of the furrow, and to rise and fall with inequalities of its surface independently of the plow itself.

*General Description with Reference to the Drawings.*

A represents the sheath of a common shovel-plow.

B is a rod or bolt which temporarily connects to said sheath the beam C of a corn-planter, whose ground-wheel D, and covering-share E, rest upon the ground.

Figure 1:
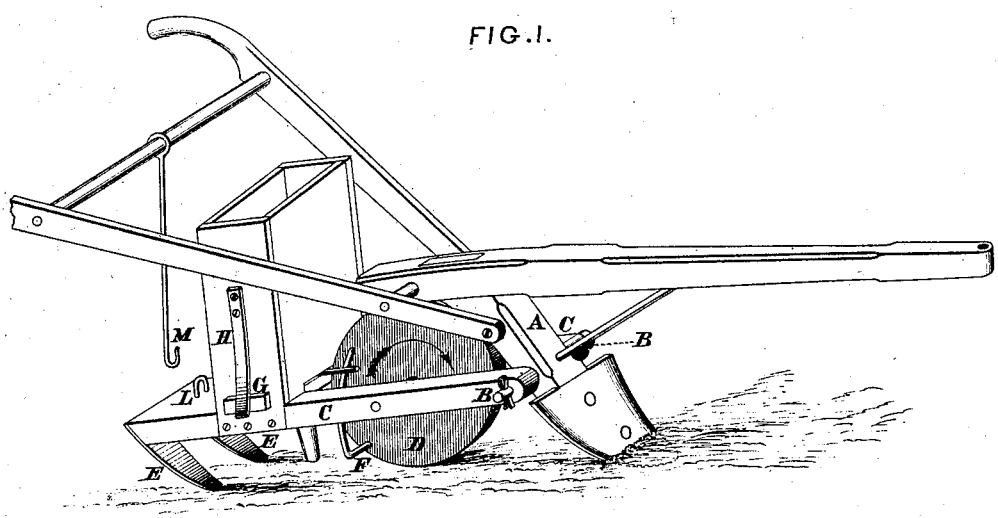
Figure 1 is a perspective representation of a common shovel-plow or "marker" provided with my corn-planting attachment.
Figure 2:
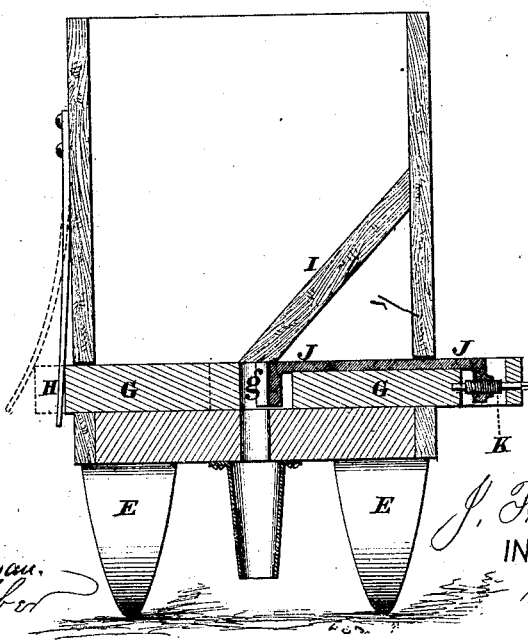
Figure 2 is an enlarged transverse section of the dropper, looking rearward.

The ground-wheel has a cam-projection, F, which, at every rotation, operates a suitable slide on the dropper G, whose receptacle g, having collected its modicum of corn, is at the proper instant promptly returned to the discharging position (see fig. 2,) by the spring H.

I is a cut-off to prevent the irregular escape of corn.

J is a gauge-plate operated by a screw, K, by which the size of the receptacle and consequent discharge of grain is regulated.

The rear end of the beam has an eye or staple, L, which, being engaged over the hook M, lifts the planter clear of the ground so as to suspend its operation when desired.

By means of two or more cams upon the ground-wheel the corn may be planted in drills.

*Operation.*

Corn is by this device planted and covered in the act of marking or laying off the rows, by attaching the planter to the rear of the ordinary marking-plow, as above described.

By this means not only is much time and labor saved, but the corn is planted in a better condition of the soil, and consequently under more favorable circumstances for germinating.

When no longer needed this planter may be quickly detached and housed for future use, thus leaving the plow at liberty for its ordinary purposes.

*Claims.*

I claim as my invention—

1. The gravitating or "floating" corn-planter, constructed as described, and hinged to a common plow in the manner described, so as to allow the former to rise and fall with any inequalities in the ground.

2. The combination and arrangement of the sheath A of a common plow, hinge-bolt B, beam C of a corn-planter, ground-wheel D, covering-shares E, cam F, slide G, spring H, cut-off I, gauge-plate J, screw K, staple L, and hook M, substantially as shown and set forth.

In testimony of which invention I hereunto set my hand.

JOHN F. BYLAND.

Witnesses:
GEO. H. KNIGHT,
JAMES H. LAYMAN.